United States Patent
Neeson

(10) Patent No.: US 12,336,509 B2
(45) Date of Patent: Jun. 24, 2025

(54) FETCHABLE LEASH DEVICE

(71) Applicant: Brandon Neeson, Killeen, TX (US)

(72) Inventor: Brandon Neeson, Killeen, TX (US)

( * ) Notice: Subject to any disclaimer, the term of this patent is extended or adjusted under 35 U.S.C. 154(b) by 0 days.

(21) Appl. No.: 18/386,646

(22) Filed: Nov. 3, 2023

(65) Prior Publication Data

US 2025/0143265 A1    May 8, 2025

(51) Int. Cl.
 *A01K 27/00* (2006.01)
 *A01K 15/02* (2006.01)

(52) U.S. Cl.
 CPC .......... *A01K 27/003* (2013.01); *A01K 15/025* (2013.01); *A01K 27/008* (2013.01)

(58) Field of Classification Search
 CPC .. A01K 27/003; A01K 27/008; A01K 15/025; A01K 27/004; A01K 27/006
 See application file for complete search history.

(56) References Cited

U.S. PATENT DOCUMENTS

| | | | | |
|---|---|---|---|---|
| 5,233,942 | A * | 8/1993 | Cooper | A01K 27/003 |
| | | | | 119/858 |
| 5,727,500 | A | 3/1998 | Conboy | |
| 5,890,637 | A * | 4/1999 | Furneaux | A45F 3/00 |
| | | | | 224/236 |
| 6,085,695 | A * | 7/2000 | Miller | A01K 27/006 |
| | | | | 224/604 |
| 6,305,329 | B1 * | 10/2001 | Levy, Jr. | G09F 3/04 |
| | | | | 119/858 |
| 6,418,881 | B1 * | 7/2002 | Starratt | A01K 27/006 |
| | | | | 119/769 |
| 6,845,737 | B1 | 1/2005 | Austin | |
| D651,366 | S | 12/2011 | Fisher | |
| 9,861,078 | B1 * | 1/2018 | Mantelli | A01K 27/008 |
| 10,492,472 | B1 * | 12/2019 | Moloznik | A01K 27/008 |
| 12,035,691 | B1 * | 7/2024 | Conley-Goltz | A01K 27/008 |
| 2011/0011504 | A1 * | 1/2011 | Steinbacher | A45C 15/00 |
| | | | | 150/106 |
| 2012/0199081 | A1 | 8/2012 | Daye | |
| 2015/0075448 | A1 * | 3/2015 | Clark | A01K 27/00 |
| | | | | 119/797 |
| 2015/0144072 | A1 * | 5/2015 | Whitefield | A01K 27/008 |
| | | | | 224/191 |
| 2016/0135432 | A1 * | 5/2016 | Cox | A01K 27/008 |
| | | | | 119/795 |
| 2017/0094945 | A1 * | 4/2017 | Sullivan | A01K 27/003 |

(Continued)

FOREIGN PATENT DOCUMENTS

WO    WO2007103570    9/2007

*Primary Examiner* — Trinh T Nguyen

(57) ABSTRACT

A fetchable leash device for leading and playing with a pet animal includes a tether having a first end and a second end. A handle is coupled to the first end. A hook is coupled to the second end to engage a collar of the animal being led by the tether. A tether pouch is coupled to the tether adjacent to the first end. The tether pouch comprises a first portion being coupled to a second portion. The first portion and the second portion pivot together around the tether thereby defining a pocket. The tether includes a middle section that extends between the tether pouch and the second end. The tether has a plurality of creases arranged along a length of the middle section. The middle section is foldable along each of the plurality of creases to define a folded tether. The folded tether is positionable within the pocket.

18 Claims, 8 Drawing Sheets

(56) References Cited

U.S. PATENT DOCUMENTS

| | | | |
|---|---|---|---|
| 2017/0142934 A1* | 5/2017 | Evans | H02J 50/12 |
| 2019/0059334 A1* | 2/2019 | Wilson | A01K 27/008 |
| 2019/0373861 A1* | 12/2019 | Jirsa | A01K 27/005 |

* cited by examiner

FETCHABLE LEASH DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pet leashes and more particularly pertains to a new pet leash for leading and playing with a pet.

(2) Description of Related Art Including Information Disclosed Under 37 CFR 1.97 and 1.98

The prior art relates generally to pet leashes, and more specifically to dog leashes. Leashes are available in multiple forms, including standard leashes, retractable leashes, and adjustable leashes. There are even leashes that are specially designed for travelling or exercising with your dog. For example, some leashes include rigid arms or attachments that maintain a position of the dog relative to a bike to inhibit the dog from tipping or steering the bike. Other leashes include specialized buckle attachments that can fasten the dog into a seatbelt when taking the dog in a car. There are also leashes with attached plastic containers for storing bags while walking with the dog. However, there is a need in the art for a pet leash that has an attached bag for storing the leash itself. Such a leash would be useful when travelling with the dog, for example so that the user can store the leash while they are at a dog park. There is also a need in the art for a pet leash that can be used as a dog toy. Such leashes would be particularly useful at dog parks, so that the user does not need to pack both the leash and the toy for the dog.

BRIEF SUMMARY OF THE INVENTION

An embodiment of the disclosure meets the needs presented above by generally comprising a tether having a first end and a second end. A handle is coupled to the first end. A hook is coupled to the second end and is configured to engage a collar of an animal being led by the tether. A tether pouch is coupled to the tether adjacent to the first end. The tether pouch comprises a first portion that is coupled to a second portion. The first portion and the second portion pivot together around the tether thereby defining a pocket. The tether includes a middle section that extends between the tether pouch and the second end. The tether has a plurality of creases arranged along a length of the middle section. The middle section is foldable along each of the plurality of creases to define a folded tether. The folded tether is positionable within the pocket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
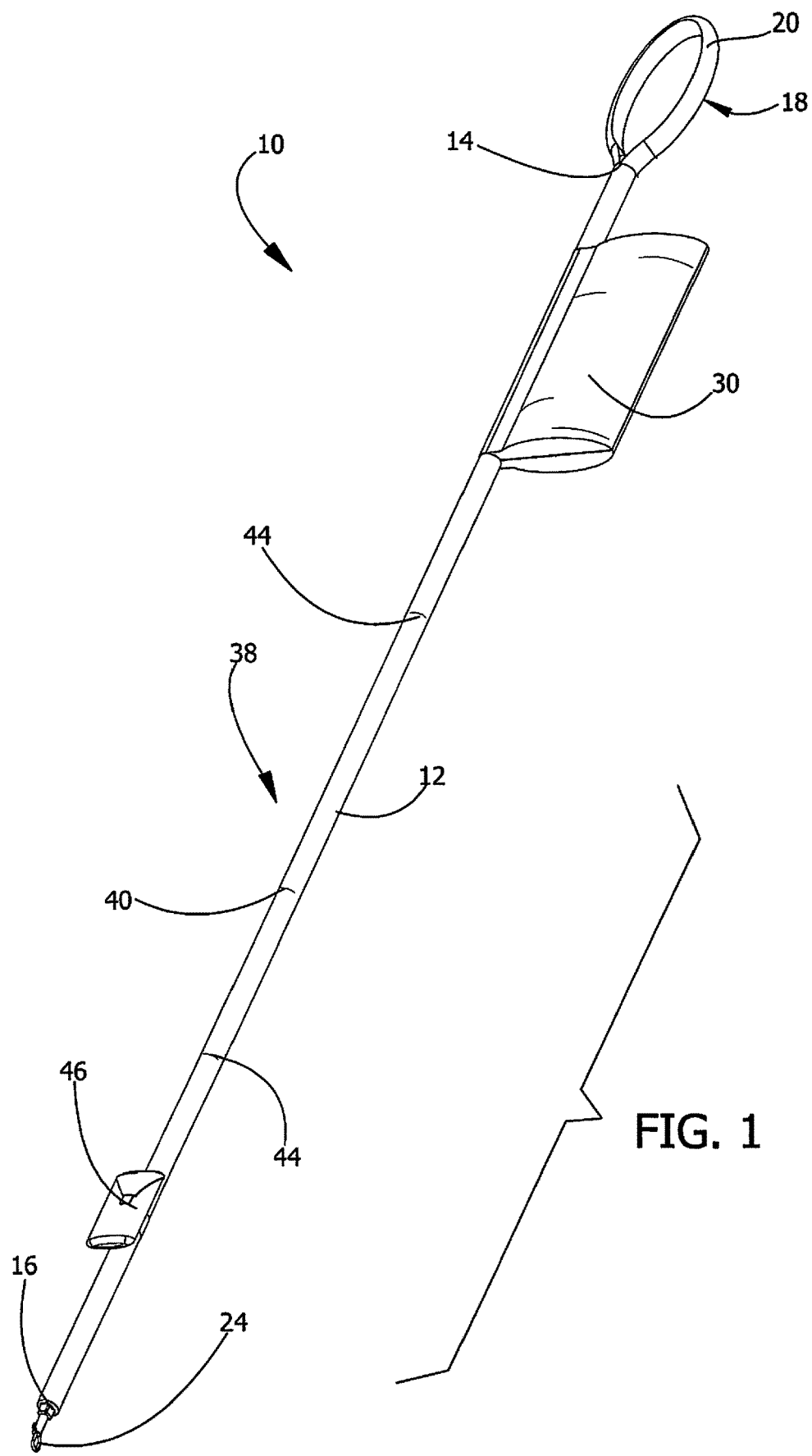
FIG. 1 is an isometric view of a fetchable leash device according to an embodiment of the disclosure.
Figure 2:
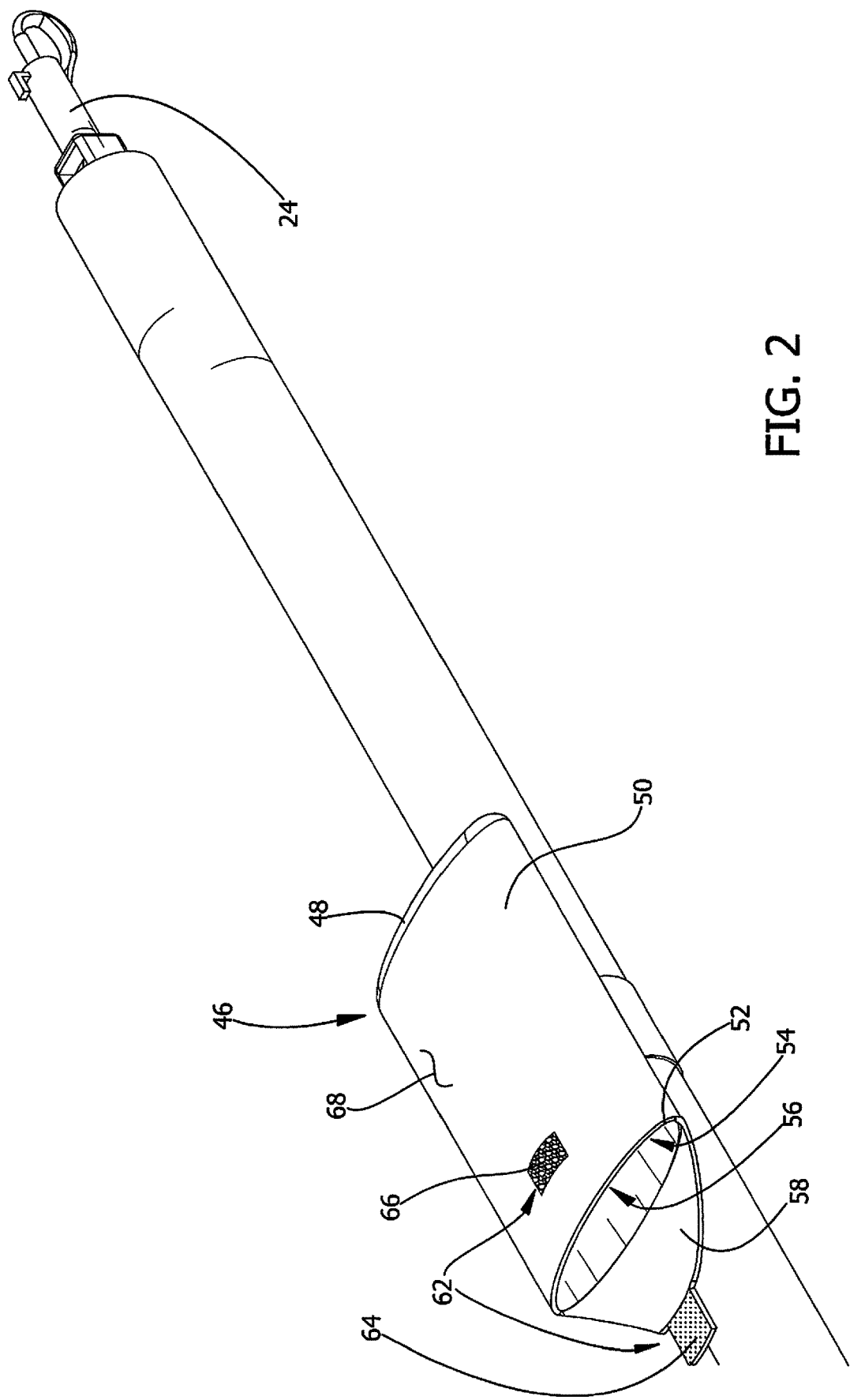
FIG. 2 is a detail view of an embodiment of the disclosure.

With reference now to the drawings, and in particular to FIGS. 1 through 8 thereof, a new pet leash embodying the principles and concepts of an embodiment of the disclosure and generally designated by the reference numeral 10 will be described.

As best illustrated in FIGS. 1 through 8, the fetchable leash device 10 generally comprises a tether 12 having a first end 14 and a second end 16. The tether 12 may generally have a length between 3.0 feet and 10.0 feet, although some embodiments may be shorter or longer. The tether 12 may comprise materials that are safe or designed for pets, particularly dogs, such as materials that are selected from the group comprising rubbers such as neoprene, plastics, or ropes made of fibers such as nylon.

A handle 18 is coupled to the first end 14. The handle 18 may comprise a loop 20 that is configured for gripping by a user 22. A hook 24 is coupled to the second end 16. The hook 24 is configured to engage a collar 26 of an animal 28 being led by the tether 12. In some embodiments, the hook 24 may comprise a metal or plastic material.

A tether pouch 30 is coupled to the tether 12 adjacent to the first end 14. The tether pouch 30 comprises a first portion 32 that is coupled to a second portion 34. The first portion 32 and the second portion 34 pivot together around the tether 12 thereby defining a pocket 36. The tether pouch 30 may comprise a nylon or canvas material, which may include reinforced or double-stitched seams. For example, the tether pouch 30 may comprise a canvas lining, a nylon-fused backing, and double stitched seams for added durability. In other examples, the tether pouch may include natural or synthetic rubber materials that are safe for dogs and other pets to chew on or carry in their mouths, such as neoprene.

The tether 12 includes a middle section 38 that extends between the tether pouch 30 and the second end 16. The tether 12 has a plurality of creases 40 arranged along a length of the middle section 38. The tether 12 is foldable along each of the plurality of creases 40 to define a folded tether 42. Each of the plurality of creases 40 is spaced from the others along the length of the middle section 38. In the example shown in FIG. 4, the plurality of creases 40 includes four creases. Other embodiments may have different numbers of the plurality of creases 40, depending on the lengths of the middle section 38 and the tether 12, or depending on the size of the tether pouch 30. For example, a longer tether 12 may have a greater number of the plurality of creases 40 while a shorter tether 12 may have a smaller number of the plurality of creases 40. This is because the folded tether 42 is positionable within the pocket 36. Thus, the precise number of the plurality of creases 40 will be configured to ensure that the folded tether 42 fits within the pocket 36.

A plurality of markings 44 is printed on the tether 12. Each of the plurality of markings 44 is positioned on top of a respective one of the plurality of creases 40 whereby the plurality of markings 44 facilitate folding the tether 12 into the folded tether 42 such that the folded tether 42 fits within the pocket 36. Again, the precise number of the plurality of markings 44 will depend on the length of the tether 12 and the size of the pocket 36. As explained above, the plurality of markings 44 and the plurality of creases 40 are configured to ensure that the folded tether 42 fits within the pocket 36.

A hook pouch 46 may be coupled to the tether 12 proximate to the second end 16. The hook pouch 46 may generally comprise a bottom wall 48 that is to a peripheral wall 50. The peripheral wall 50 may have a top edge 52 defining an opening 54 into an interior space 56. The hook pouch 46 is configured to receive the hook 24 within the interior space 56. The hook pouch 46 may have a flap 58 that is coupled to the top edge 52 for selectively closing the opening 54. The hook pouch 46 may comprise a nylon or canvas material, which, like the tether pouch 30, may include reinforced or double-stitched seams. The hook pouch 46 may also include other natural or synthetic materials that are safe for pets.

The hook pouch 46 is positionable within the pocket 36 when the hook 24 is inserted into the interior space 56 and the folded tether 42 is positioned in the pocket 36. The handle 18 may extend outwardly from the pocket 36 when one or both of the folded tether 42 and the hook pouch 46 is positioned in the pocket 36. The tether pouch 30 and the handle 18 define a fetchable toy 30 when the hook 24 is positioned in the hook pouch 46 and when the hook pouch 46 and the folded tether 42 are positioned in the pocket 36.

A coupler 62 may be to the hook pouch 46 to retain the flap 58 over the top edge 52 thereby closing the opening 54. For example, the coupler 62 may comprise a first coupling member 64 that is attached to the flap 58 and a second coupling member 66 that is removably engageable with the first coupling member 64. The second coupling member 66 may be attached to the peripheral wall 50, for example on an exterior surface 68 of the peripheral wall 50. In the example shown in FIG. 2, the coupler 62 comprises a hook and loop material. In other examples, the coupler 62 may comprise a button, a snap, a zipper, or a cord. Other couplers may also be used.

Figure 3:
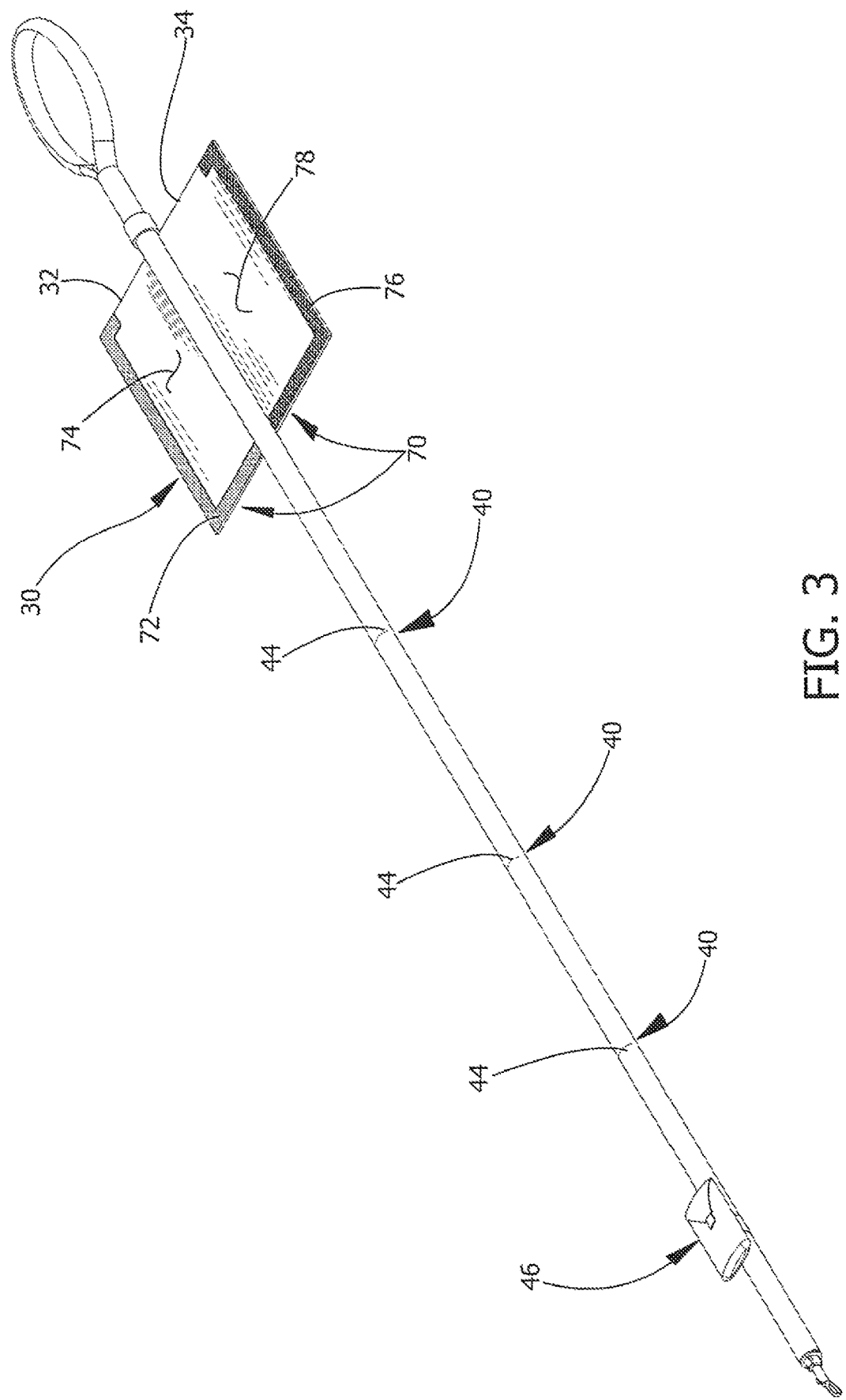
FIG. 3 is a perspective view of an embodiment of the disclosure.
Figure 4:
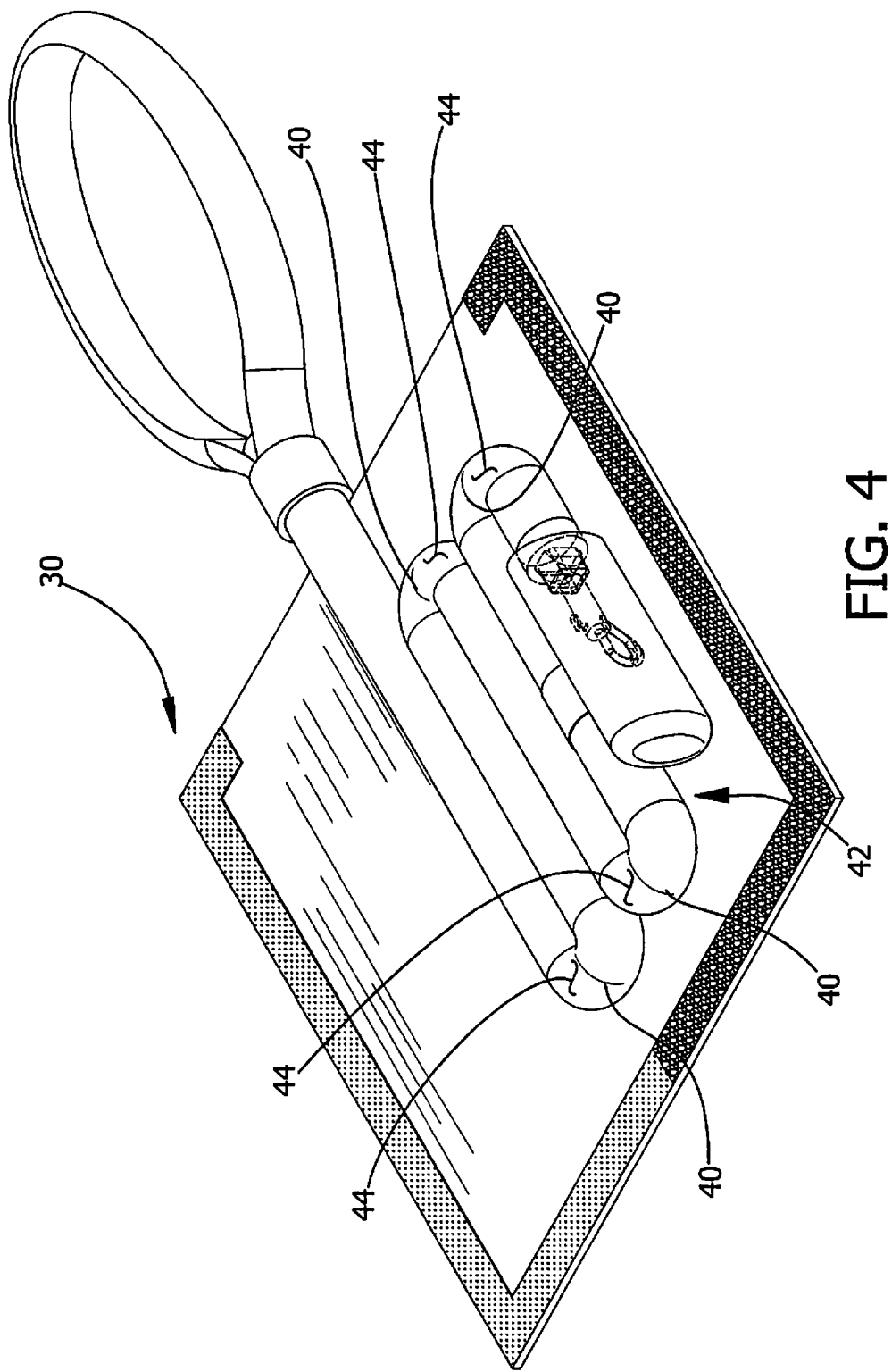
FIG. 4 is a perspective view of an embodiment of the disclosure.
Figure 5:
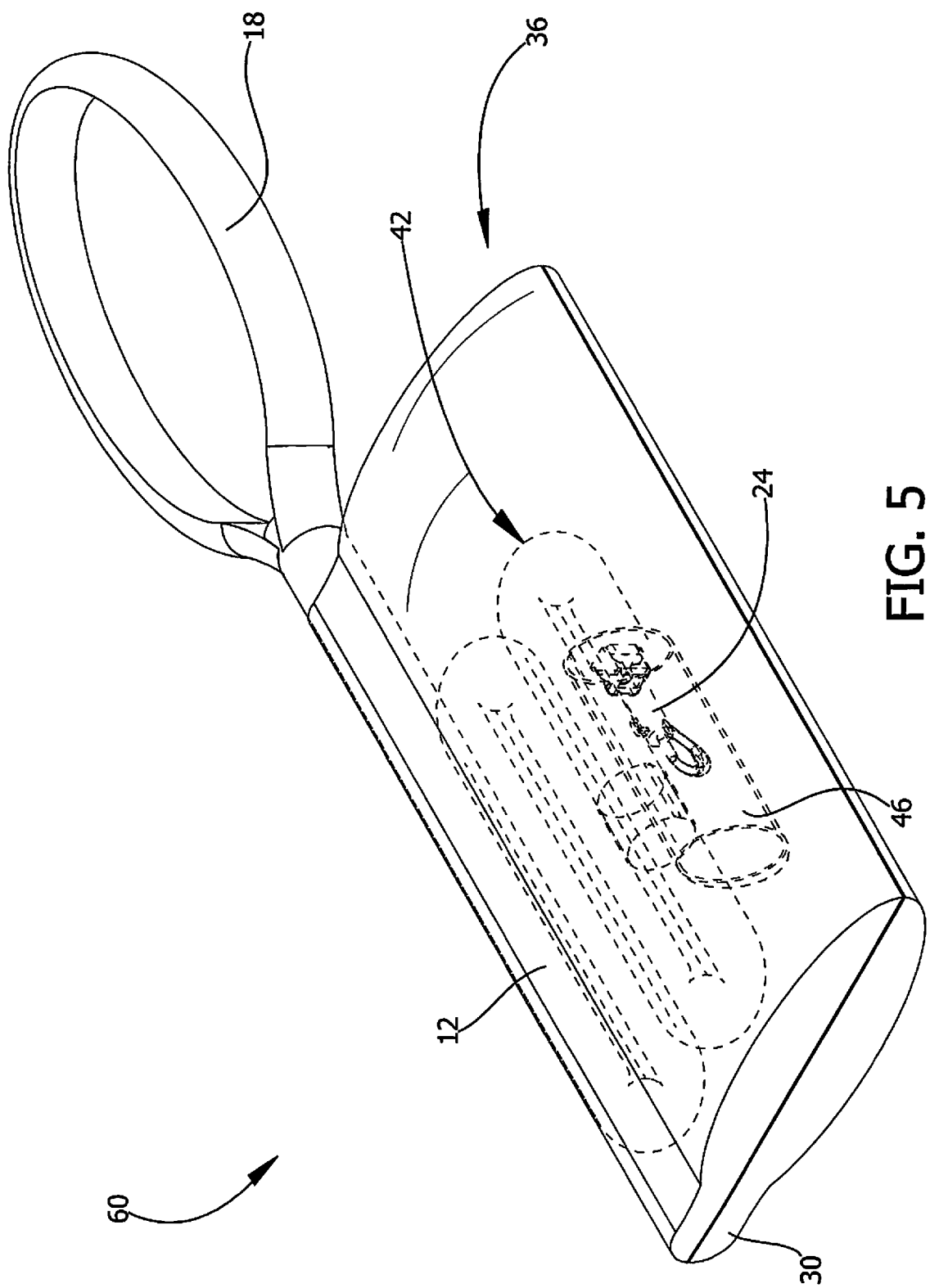
FIG. 5 is a perspective view of an embodiment of the disclosure.
Figure 6:
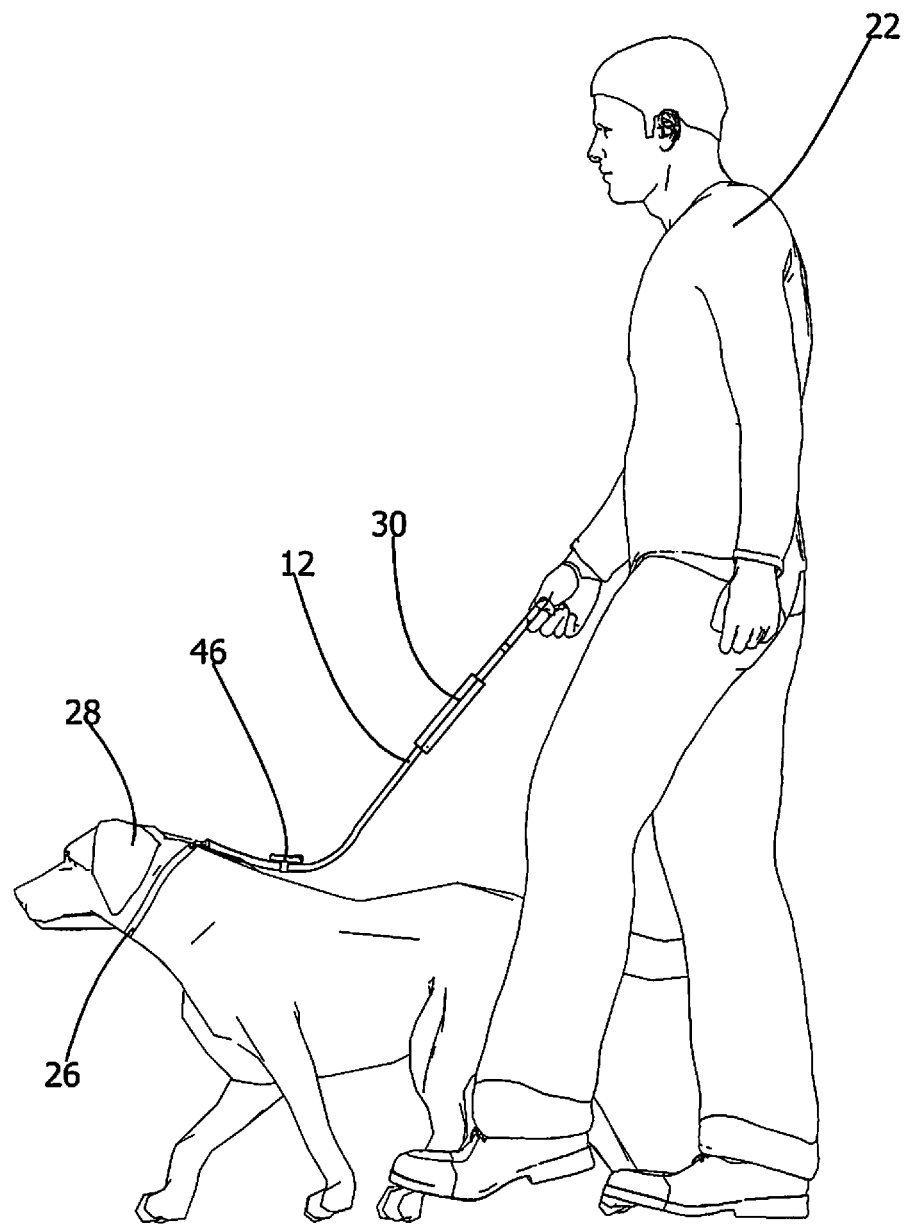
FIG. 6 is an in-use view of an embodiment of the disclosure.
Figure 7:
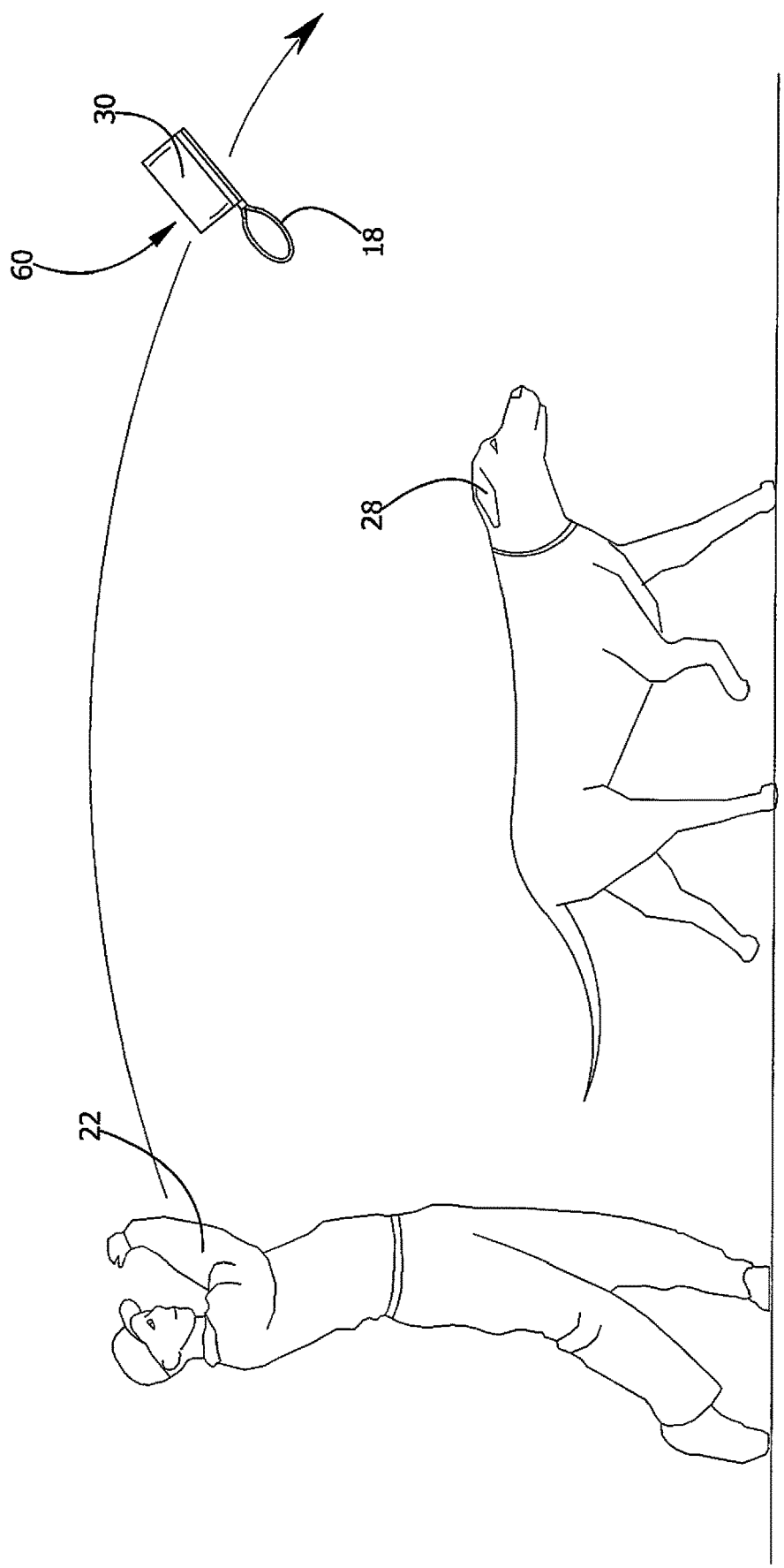
FIG. 7 is an in-use view of an embodiment of the disclosure.
Figure 8:
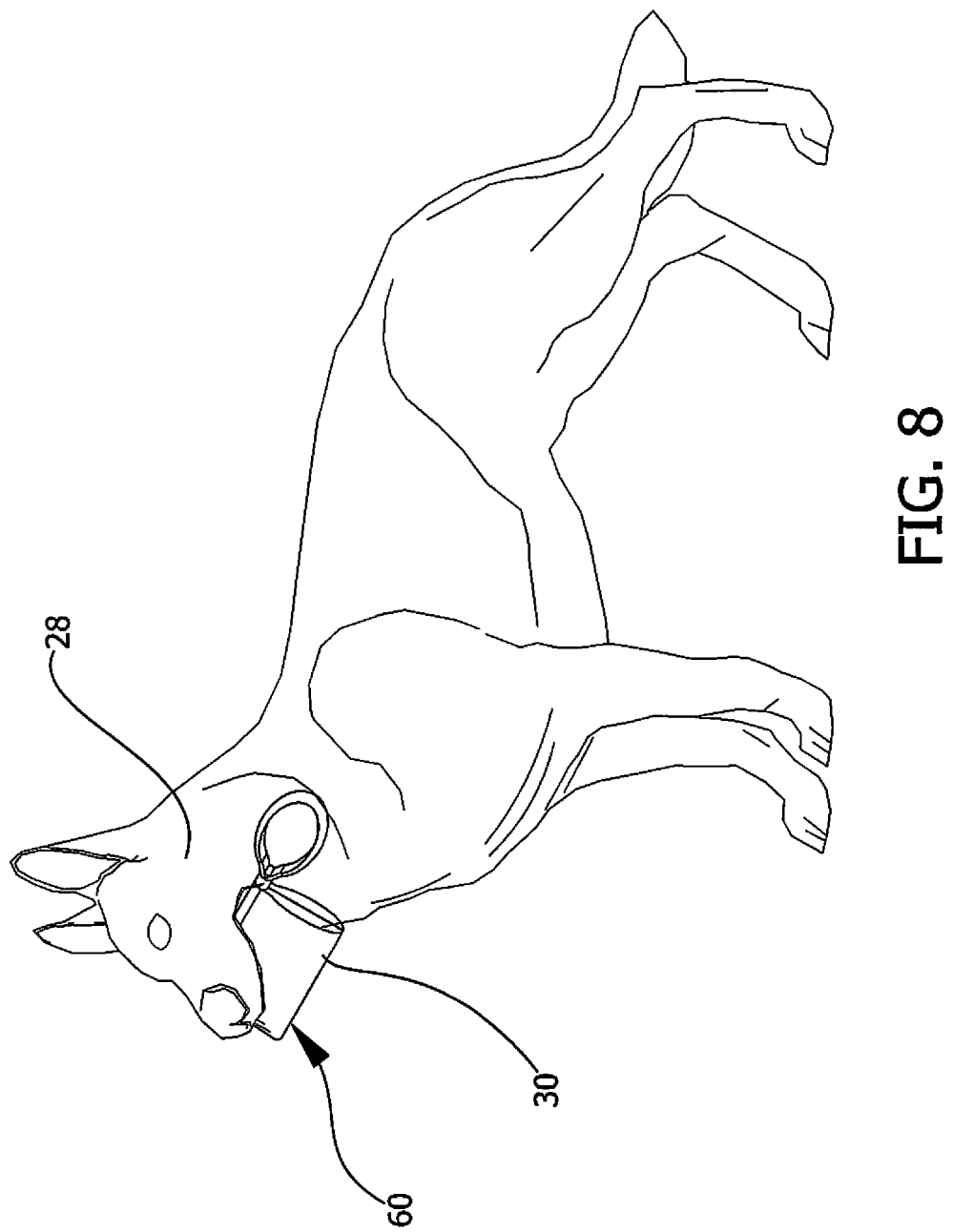
FIG. 8 is an in-use view of an embodiment of the disclosure.

A fastener 70 may be coupled to the tether pouch 30 for releasably coupling the first portion 32 and the second portion 34 together. For example, the fastener 70 may comprise a first mating member 72 that is attached to the first portion 32 and a second mating member 76 that is removably engageable with the first mating member 72. In some embodiments, the first mating member 72 is attached to an inner surface 74 of the first portion 32 and the second mating member 76 is attached to an interior surface 78 of the second portion 34. FIGS. 3 and 4 show examples wherein the fastener 70 comprises a hook and loop material. In other examples, the fastener 70 may comprise a button, a snap, a zipper, or a cord. Other fasteners may also be used. However, the because the fetchable toy 60 may be exposed to the animal 28, and particularly to the mouth of the animal 28, the fastener 70 should be safe for the animal 28 to chew on or hold in their mouths.

In use, the tether 12 may be attached to the animal 28, for example by engaging the collar 26 with the hook 24. The user 22 may travel to a park or other area where the user 22 wants to play fetch with the animal 28. The tether 12 can then be removed from the animal 28, for example by disengaging the hook 24 from the collar 26. Then, the hook 24 may be positioned within the hook pouch 46 and the flap 58 of the hook pouch 46 may be fastened to the peripheral wall 50 to close the opening 54, thereby securing the hook 24 within the interior space 56.

Using the plurality of markings 44 as a guide, the user 22 can fold the tether 12 along each of the plurality of creases 40 to form the folded tether 42. The folded tether 40 and the hook pouch 46 may be enclosed within the pocket 36 to define the fetchable toy 60. To ensure the folded tether 40 and hook pouch 46 remain within the pocket 36, the user 22 can engage the first mating member 72 of the fastener 70 on the tether pouch 30 with the second mating member 76. Then, the user 22 can toss the fetchable toy 60 such that the animal 28 can retrieve the fetchable toy 60. When the user 22 and animal 28 are finished playing, the user 22 can remove the folded tether 42 and the hook pouch 46 from the pocket 36, unfold the folded tether 42, remove the hook 24 from the hook pouch 46, and re-attach the tether 12 to the animal 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A leash assembly comprising:
a tether having a first end and a second end;
a handle being coupled to the first end;
a hook being coupled to the second end, the hook being configured to engage a collar of an animal being led by the tether;
a tether pouch being coupled to the tether adjacent to the first end, the tether pouch comprising a first portion being coupled to a second portion, the first portion and the second portion pivoting together around the tether thereby defining a pocket;
the tether including a middle section, the middle section extending between the tether pouch and the second end;
the tether having a plurality of creases being arranged along a length of the middle section, the middle section being foldable along each of the plurality of creases to define a folded tether;
wherein the folded tether is positionable within the pocket; and
a plurality of markings being printed on the tether, each of the plurality of markings being positioned on a respective one of the plurality of creases whereby the plurality of markings facilitate folding the tether into the folded tether such that the folded tether fits within the pocket.

2. The leash device of claim 1, wherein the tether has a length between 3.0 feet and 10.0 feet.

3. The leash device of claim 1, wherein the hook includes a metal material.

4. The leash device of claim 1, further comprising a hook pouch being coupled to the tether proximate to the second end, the hook pouch comprising a bottom wall coupled to a peripheral wall with a top edge defining an opening into an interior space whereby the hook pouch is configured to receive the hook within the interior space.

5. A leash assembly comprising:
a tether having a first end and a second end;
a handle being coupled to the first end;
a hook being coupled to the second end, the hook being configured to engage a collar of an animal being led by the tether;
a tether pouch being coupled to the tether adjacent to the first end, the tether pouch comprising a first portion being coupled to a second portion, the first portion and the second portion pivoting together around the tether thereby defining a pocket;
the tether including a middle section, the middle section extending between the tether pouch and the second end;
the tether having a plurality of creases being arranged along a length of the middle section, the middle section being foldable along each of the plurality of creases to define a folded tether;
wherein the folded tether is positionable within the pocket; and
a hook pouch being coupled to the tether proximate to the second end, the hook pouch comprising a bottom wall coupled to a peripheral wall with a top edge defining an opening into an interior space whereby the hook pouch is configured to receive the hook within the interior space, wherein the hook pouch is positionable within the pocket when the hook is inserted into the interior space and the folded tether is positioned in the pocket.

6. The leash device of claim 4, wherein each of the tether pouch and the hook pouch include a nylon material.

7. The leash device of claim 4, the hook pouch further comprising a flap being coupled to the top edge for selectively closing the opening.

8. The leash device of claim 7, further comprising a coupler being coupled to the hook pouch to retain the flap over the top edge thereby closing the opening.

9. The leash device of claim 8, the coupler further comprising:
a first coupling member being attached to the flap; and
a second coupling member being removably engageable with the first coupling member, the second coupling member being attached to the peripheral wall.

10. The leash device of claim 8, wherein the coupler comprises a hook and loop material.

11. The leash device of claim 1, the handle further comprising a loop being configured for gripping by a user.

12. The leash device of claim 1, further comprising a fastener being coupled to the tether pouch, the fastener releasably coupling the first portion and the second portion together.

13. The leash device of claim 12, the fastener further comprising:
a first mating member being attached to the first portion; and
a second mating member being removably engageable with the first mating member, the second mating member being attached to the second portion.

14. The leash device of claim 12, wherein the fastener comprises a hook and loop material.

15. The leash device of claim 1, wherein each of the plurality of creases is spaced from the others along the length of the middle section.

16. The leash device of claim 1, the plurality of creases including four creases.

17. The leash device of claim 1, wherein the handle extends outwardly from the pocket when the folded tether is positioned in the pocket.

18. A leash assembly comprising:
a tether having a first end and a second end, the tether having a length between 3.0 feet and 10.0 feet;
a handle being coupled to the first end, the handle comprising a loop being configured for gripping by a user;
a hook being coupled to the second end, the hook being configured to engage a collar of an animal being led by the tether, the hook comprising a metal material;
a tether pouch being coupled to the tether adjacent to the first end, the tether pouch comprising a first portion being coupled to a second portion, the first portion and the second portion pivoting together around the tether thereby defining a pocket, the tether pouch comprising a nylon material;
the tether including a middle section, the middle section extending between the tether pouch and the second end;
the tether having a plurality of creases being arranged along a length of the middle section, the tether being foldable along each of the plurality of creases to define a folded tether, each of the plurality of creases being spaced from the others along the length of the middle section, the plurality of creases including four creases;

wherein the folded tether is positionable within the pocket;

a plurality of markings being printed on the tether, each of the plurality of markings being positioned on a respective one of the plurality of creases whereby the plurality of markings facilitate folding the tether into the folded tether such that the folded tether fits within the pocket;

wherein the handle extends outwardly from the pocket when the folded tether is positioned in the pocket;

a hook pouch being coupled to the tether proximate to the second end, the hook pouch comprising a bottom wall coupled to a peripheral wall with a top edge defining an opening into an interior space, the hook pouch being configured to receive the hook within the interior space, the hook pouch having a flap coupled to the top edge for selectively closing the opening, the hook pouch comprising a nylon material;

wherein the hook pouch is positionable within the pocket when the hook is inserted into the interior space and the folded tether is positioned in the pocket;

a coupler being coupled to the hook pouch to retain the flap over the top edge thereby closing the opening, the coupler comprising:
 a first coupling member being attached to the flap;
 a second coupling member being removably engageable with the first coupling member, the second coupling member being attached to an exterior surface of the peripheral wall;

wherein the coupler comprises a hook and loop material;

a fastener being coupled to the tether pouch, the fastener releasably coupling the first portion and the second portion together, the fastener comprising:
 a first mating member being attached to an inner surface of the first portion;
 a second mating member being removably engageable with the first mating member, the second mating member being attached to an interior surface of the second portion; and wherein the fastener comprises a hook and loop material.

* * * * *